(12) United States Patent
Webster

(10) Patent No.: US 8,296,728 B1
(45) Date of Patent: Oct. 23, 2012

(54) MOBILE DEVICE INTERACTION USING A SHARED USER INTERFACE

(75) Inventor: Roger R. Webster, San Martin, CA (US)

(73) Assignee: Adobe Systems Incorporated, San Jose, CA (US)

( * ) Notice: Subject to any disclaimer, the term of this patent is extended or adjusted under 35 U.S.C. 154(b) by 992 days.

(21) Appl. No.: 12/198,824

(22) Filed: Aug. 26, 2008

(51) Int. Cl.
*G06F 9/44* (2006.01)
(52) U.S. Cl. ......... 717/109; 717/105; 717/110; 717/113
(58) Field of Classification Search .................. None
See application file for complete search history.

(56) References Cited

U.S. PATENT DOCUMENTS

| | | |
|---|---|---|
| 6,771,290 B1 | 8/2004 | Hoyle |
| 7,124,374 B1 | 10/2006 | Haken |
| 7,711,681 B2 * | 5/2010 | Dempski et al. .............. 707/600 |
| 7,765,542 B2 | 7/2010 | Wiggins et al. |
| 2006/0143129 A1 | 6/2006 | Holm et al. |

OTHER PUBLICATIONS

"Multi Monitor—Dual Monitor—KVM—Remote Control Software", retrieved from http://www.maxivista.com, 2 pages.
"Maxi Vista v3—Manual", retrieved from http://www.maxivista.com/docs3/09/manual.htm, 23 pages.
"Maxi Vista—How it Works", retrieved from http://www.maxivista.com/how.htm, 3 pages.

* cited by examiner

*Primary Examiner* — Chuck Kendall
(74) *Attorney, Agent, or Firm* — Fish & Richardson P.C.

(57) ABSTRACT

Methods, systems, and apparatus, including computer program products, for mobile device interaction using a shared user interface.

30 Claims, 4 Drawing Sheets

MOBILE DEVICE INTERACTION USING A SHARED USER INTERFACE

BACKGROUND

This specification relates to the configuration of data processing devices and the exchange of information between data processing devices.

Users of mobile devices such as cellular telephones or personal digital assistants (PDAs) periodically need to transfer data such as configuration information, software applications, contacts, email messages or music, for example, to or from their mobile devices. When a mobile device is connected to a host computer such as a desktop or a laptop computer, the mobile device typically does not appear as a natural extension of the host computer from the standpoint of the host computer's graphical user interface (GUI). For instance, some mobile devices cannot be directly interacted with from the host computer's native GUI. Instead, such devices commonly require that users run proprietary software on the host computer in order to transfer data to or from the mobile devices.

SUMMARY

In general, one aspect of the subject matter described in this specification can be embodied in a method that includes mapping a first display associated with a first data processing apparatus to a first region of a shared workspace and mapping a distinct second display associated with a distinct second data processing apparatus to a second region of the shared workspace. Input is received moving a graphical representation from a donor region comprising one of the first region and the second region to a recipient region comprising the other of the first region and the second region. In response to the moving, one or more components associated with the graphical representation are identified and installing the one or more components on the recipient region's associated data processing apparatus. Other embodiments of this aspect include corresponding systems, apparatus, and computer program products.

These and other embodiments can optionally include one or more of the following features. The first display presents the first region but not the second region, and where the second display presents the second region but not the first region. An operating system for the first data processing apparatus includes a virtual device representing the second display where the virtual device is mapped to a virtual device region of the first display. Receiving input comprises displaying a pointer on the second display when the pointer is positioned over the virtual device region. The input is a drag-and-drop operation from the donor region to the recipient region. The mapping is in response to a communication between the first data processing apparatus and the second data processing apparatus. The communication is by way of a wireless connection between the first and second data processing apparatus. Mapping comprises determining if the second data processing apparatus has allowed the mapping and preventing the mapping if the second data processing apparatus has not allowed the mapping. The installing is performed by the data processing apparatus associated with the donor region or a distinct other data processing apparatus. The one or more components is one or more of: a configuration information, capability information, content, a description of content, programming language statements or expressions, and executable software.

Particular embodiments of the subject matter described in this specification can be implemented to realize one or more of the following advantages. Files and other aspects of the mobile device can be "backed up" to the host computer by dragging them from the device to the host. A host computer's mouse can be used to interact with controls on the mobile device, controlling playback of music, videos, etc. Mobile devices can be configured and manipulated directly through a host computer's native GUI, as though they were extra displays attached to the host computer.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
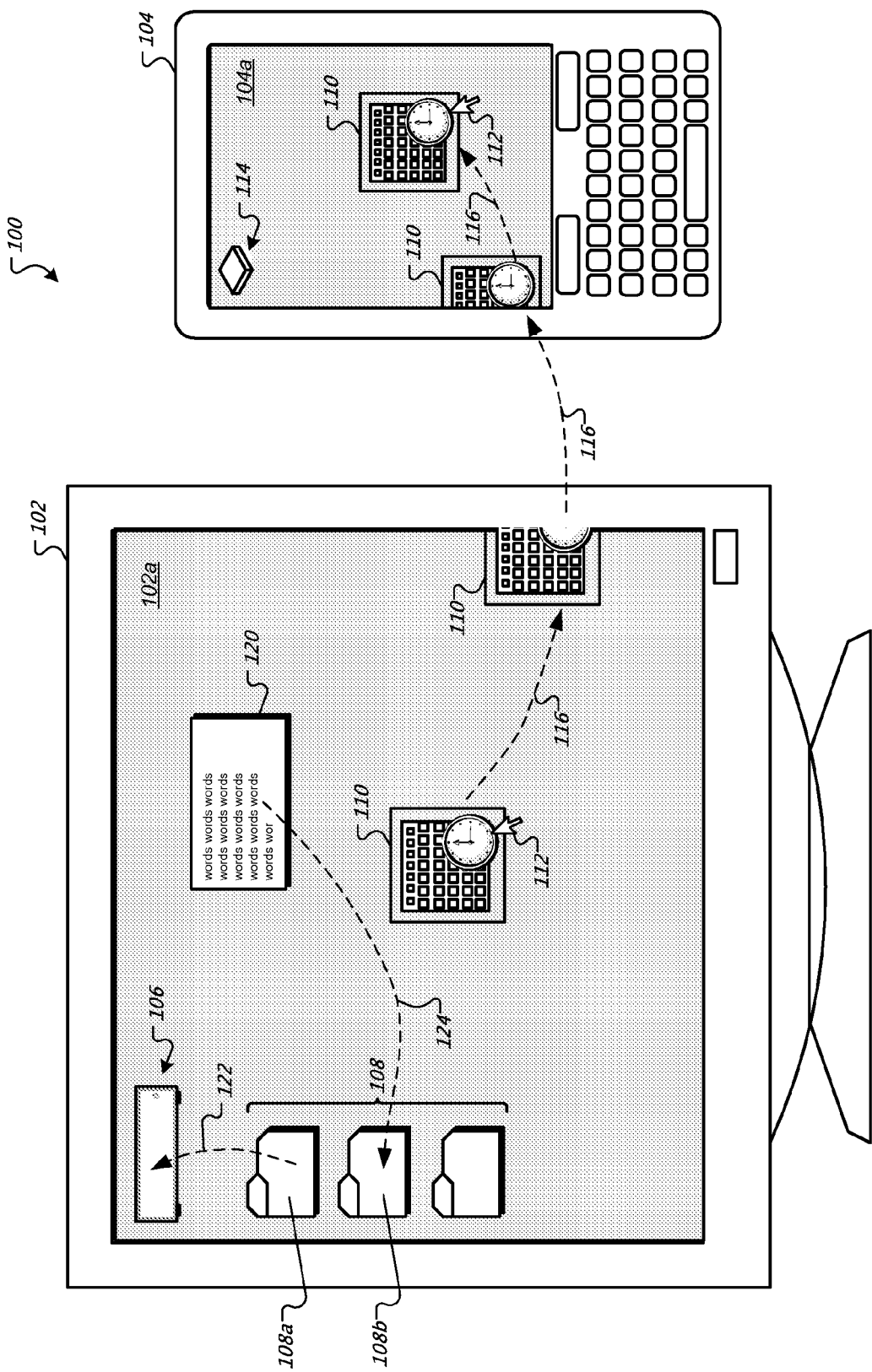
FIG. 1 is an illustration of two data processing apparatus sharing an interactive graphical user interface.

FIG. 1 is an illustration of two data processing apparatus sharing an interactive GUI that implements a desktop metaphor workspace which is a graphical analogy to a user's physical desk. (Other metaphors are possible including metaphors which are not analogies to objects in a user's physical environment.) A data processing apparatus (DPA) is any type of computing device with an integrated or separate display, persistent memory and one or more processors. For example, a DPA can be a personal computer, a portable computer, an electronic game system, a mobile phone, a smart phone, a media player, a set top box, or combinations of these. In this illustration, a system 100 includes a first DPA 102 having a display 102a and a second DPA 104 having a display 104a. In various implementations, the displays of each DPA present an interactive GUI that is partially or wholly shared between the DPAs. Data can be communicated between the DPAs by way of a wireless network connection or other means. Details of DPA communication are described below in reference to FIG. 3.

By way of illustration, a GUI can include graphical representations such as icons (e.g., 106, 108, 110, 114) that represent data or functionality, windows (e.g., 120) that represent running application programs, and a cursor 112 which is used to indicate the location of a pointing device such as a mouse in the workspace. Icons are graphical representations of data, storage locations, application programs, or other information. For instance, icon 106 is a graphical representation of a logical or physical storage "drive" for DPA 102. A drive is a file system associated with a DPA and is a local hard drive or solid state drive, attached storage, a network file system (e.g., mapped to a local drive), or other storage. Icon 110 represents a calendar application program. Icons 108 are a representation of file system directories on DPA 102's drive 106. Similarly, icon 114 represents DPA 104's drive. Data and applications represented by icons on a DPA are persisted in a file system or other organizational structure on a drive associated with that DPA. For example, the calendar application program represented by icon 110 is stored on the drive represented by 106.

Users can interact with a GUI's graphical representations (e.g., icons) on a DPA in various ways. By way of illustration, by duplicating an icon, for instance, the information represented by the icon is duplicated. Likewise, by deleting an icon (e.g., moving the icon onto a trashcan icon), the information represented by the icon is deleted. Icons can also be moved by a user to different locations on a workspace. Users can interact with icons and other objects using a computer mouse, however, other input devices are possible such as, for instance, keyboards (key press input), microphones (voice or sound input), video cameras (gesture input), touch-sensitive pads or displays (touch gesture input), and combinations of these. The input device is coupled to either DPA 102 or DPA 104.

In addition, icons and other graphical representations can be "dragged" and "dropped" onto GUI graphical representations that serve as drop targets such as icons, windows or workspace regions. The basic sequence involved in drag-and-drop is operation is: 1) a user presses and holds down a mouse button to "grab" one or more graphical representations under the cursor 112; 2) the user continues to hold down the mouse button while "dragging" the graphical representation(s) with the mouse; and 3) the graphical representation(s) are "dropped" at a new location when the user releases the button. For example, to change the location of a directory in a file system, the directory's icon (e.g., 108a) can be dragged (e.g., 122) and then dropped onto a target icon (e.g., 106) representing the new location. By way of a further example, text from a word processing application window 120 is dragged 124 and then dropped into an icon 108b representing a directory location in the DPA 102's file system.

Generally speaking, the graphical representation being dragged is associated with a so-called donor process and the graphical representation of the drop target is associated with a so-called recipient process. The donor and recipient processes can be the same or different. The recipient process is responsible for acting on the drop operation, if appropriate. In some implementations, the donor process places information (e.g., the storage location) for data associated with the dragged graphical representation in a clipboard or other data structure for use by the recipient process in identifying what is being dragged and determining how to handle the drop operation. For instance, the donor process for graphical representations dragged from a region on the workspace is typically a GUI process (e.g., a process that responds to user interaction with the workspace such as the workspace manager process). The donor process for a graphical representation dragged from an application program's window is typically the application process itself. Likewise, the recipient processes can correspond to the process associated with the drop target.

Returning to the examples above, the folder icon 108a is associated with a donor GUI process. In some implementations, when the icon is dragged 122 information regarding the location of the file is placed on the clipboard by the donor process. Other ways of communicating information regarding what is being dragged are possible. When the icon 108a is dropped onto the drive icon 106, a recipient process examines the clipboard to determine the location of the file and then performs a copy or move operation to place the contents of the file in the top level directory of the file system associated with drive 106. When text from a word processing application window 120 is dragged 124, a copy of the text is placed on the clipboard along with source formatting information for the text by the word processing application. When the graphical representation of the text is dropped into the directory icon 108b, a recipient process copies the text from the clipboard into a new file created in the directory represented by icon 108b.

In various implementations, interaction with graphical representations can be extended to implicate more than one underlying DPA when each DPA's display maps to a region of a shared workspace. For example, a graphical representation 110 can be moved from display 102a to display 104a with a single, continuous mouse movement 116 resulting in data represented by the graphical representation 110 being copied from a drive on DPA 102 (or another DPA) to a drive on DPA 104. The movement of graphical representations from one workspace region to another is discussed in more detail below.

Figure 2:
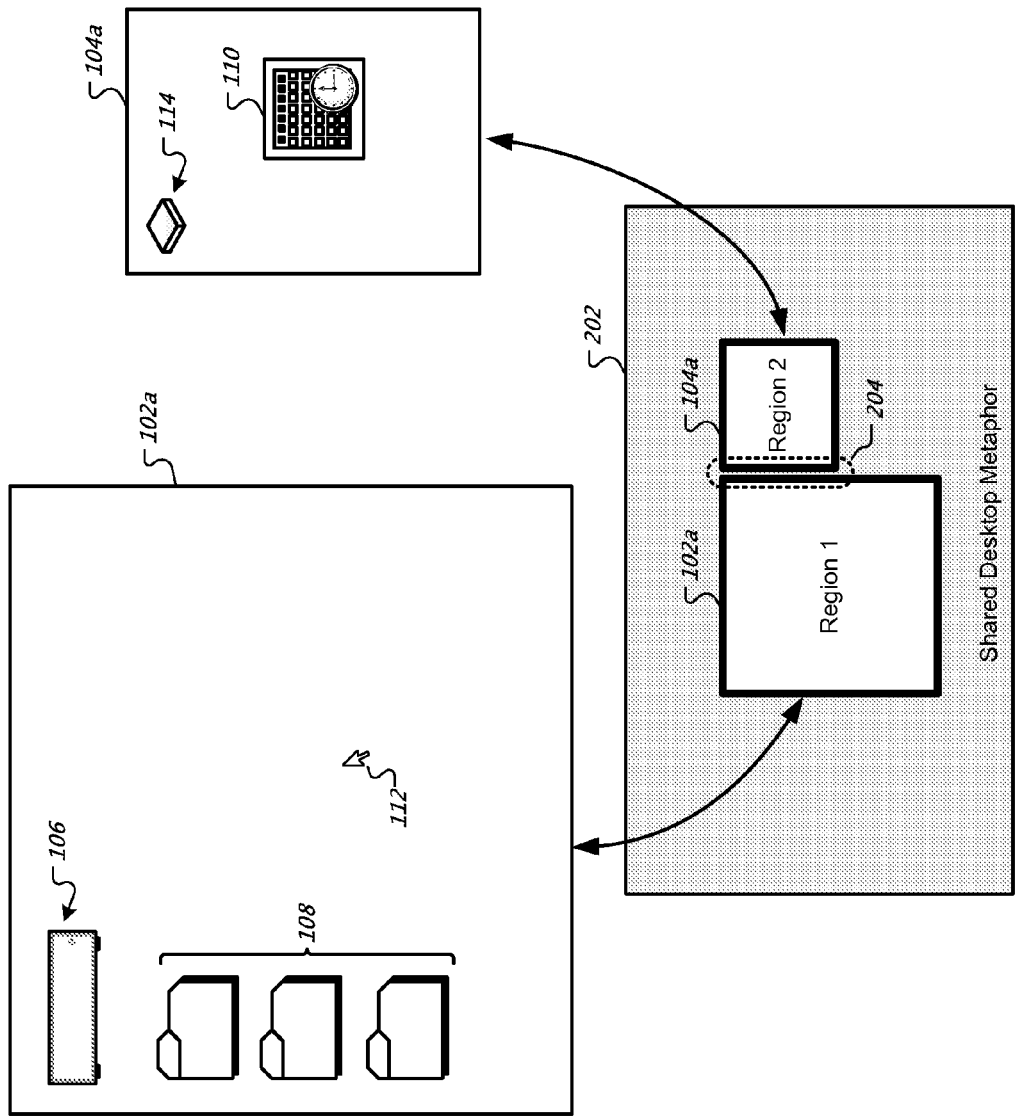
FIG. 2 is an example of how displays of different data processing apparatus are mapped to a shared workspace.

FIG. 2 is an example of how displays of different data processing apparatus are mapped to a shared workspace. Shared workspace 202 depicts an entire area of a workspace or other GUI "space" in which graphical representations such as icons and windows are located. A DPA's display, or one or more portions thereof, can be mapped to a region of the shared workspace 202. For example, the entire area of display 102a is mapped to Region 1 of the shared workspace 202 and the entire area of display 104a is mapped to Region 2 of the shared workspace 202. While displays 102a and 104a are physically separate display monitors, in various implementations they act as viewports or are "mapped" onto different regions of the same shared workspace 202. Although two regions are illustrated, a given display can have more than one portion of its display area mapped to different regions in the shared workspace 202. Moreover, more than two displays can be mapped to the shared workspace 202.

Generally speaking, the shared workspace 202 has a coordinate system which is used to place graphical representations, display regions and a cursor. In some implementations, the coordinate system is two dimensions, however higher dimensions are possible. The shared workspace 202 regions to which displays, or portions thereof, are mapped have a spatial relationship to each other. For example, Region 1 is adjacent to, and to the left of, Region 2. The spatial relationship of shared workspace 202 regions allows the cursor (e.g., 112) to be moved between the physical displays 102a and 104a. The cursor can be moved across a border (e.g., 204) defined by adjacent regions in the shared workspace 202. For example, when the cursor leaves Region 1 and enters Region 2, the cursor seamlessly disappears from display 102a and reappears on display 104a, and vice versa. Alternatively, when a cursor leaves a shared workspace 202 region the cursor's new location is not in an adjacent region.

In various implementations, when graphical representations are dragged from one shared workspace 202 region and dropped in another shared workspace 202 region, components associated with the graphical representation are automatically installed on the DPA whose display is mapped to the region in which the drop operation occurred. In this way, information such as, for instance, address books and music files, can be easily moved between DPAs, such as between desktop computers and mobile devices. By way of illustration and with reference to FIG. 1, the icon 110 representing a calendar application program can be dragged from a shared workspace 202 region associated with the DPA 102 using a mouse or other input device coupled to the DPA 102, and then dropped on a shared workspace 202 region associated DPA 104 (or vice versa) using the same mouse or input device coupled to DPA 102, thereby causing the installation of components (e.g., a calendar application program) on DPA 104. In some implementations, drag-and-drop operations across shared workspace 202 regions are enabled or disabled based on permissions associated with the DPAs or a user, or based on predetermined preferences or settings.

Generally speaking, a component is configuration information, capability information, content, a description of content, programming language statements or expressions, executable software, or combinations of these. Other types of components are possible. By way of illustration, configuration information can include hardware or software settings that are used to configure the resolution of a DPA's display device or a user's account information for an email application program, for instance. Content can include audio content such as music, images, video, graphics, text content, and combinations of these. Other content is possible. By way of illustration, a description of content can include a location of the content (e.g., a Universal Resource Locator) and a content type.

Figure 3:
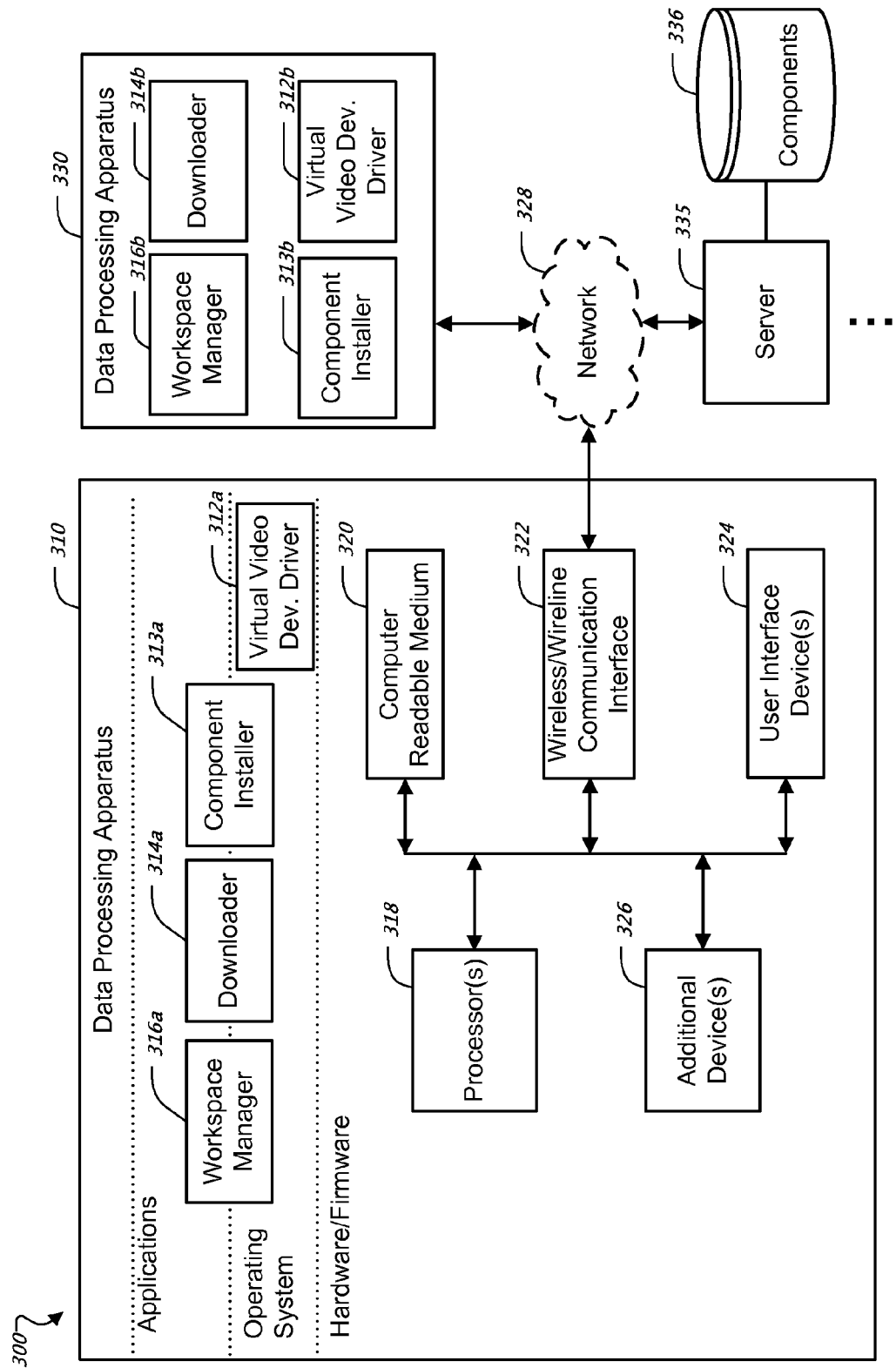
FIG. 3 is a block diagram of an example system for data processing apparatus interaction.

FIG. 3 is a block diagram of an example system 300 for DPA interaction. DPA 310 includes hardware/firmware, an operating system and one or more applications or application modules (hereinafter referred to as "applications") including a workspace manager 316a, a downloader 314a, a component installer 313a and a virtual video device driver (VVDD) 312a. Similarly, DPA 330 includes one or more applications or applications modules including a workspace manager 316b, a downloader 314b, a component installer 313b and a virtual video device driver 312b. In some implementations, some or all of the applications on DPAs 310 and 330 can be built partially or entirely into the operating system (OS) of a DPA. Machine-level or higher-level instructions for the applications are stored in the computer readable medium 320 (e.g., memory, disk drives, solid state drives) and are executed by processors 318. The applications on DPA 310 can communicate with the applications on DPA 330 using the communication interface 322 or other interface. For example, the communication interface 322 can implement a wireless communication protocol (e.g., Wi-Fi, Bluetooth) which can be used by an application running on DPA 310 to communicate with DPA 330 directly or through one or more communication networks 328, or vice versa. User interface devices 324 such as output devices (displays and speakers), input devices (e.g., mouse and keyboard), and other devices are accessed by the applications directly on DPAs 310 and 330 or through calls to an application programming interface (API) supplied by the OS.

The workspace manager 316a-b is responsible for responding to user interaction with the shared workspace such as user manipulation of icons to perform file operations and launch application programs. The workspace manager 316a-b receives user input events such as, for instance, mouse movement or mouse button clicks from user interface devices 324 and the VVDD 312a-b. Before describing VVDDs in more detail, some terminology is needed to distinguish between DPAs. The DPA (e.g., 310) on which a user is controlling a display cursor (e.g., 112) by way of a user interface device 324 is referred to as the primary DPA. The other DPA (e.g., 330) is referred to as the secondary DPA. The notion of which DPA is primary and which is secondary can change over time based on which DPA a user is directly interacting with. In various implementations, when a user is manipulating a cursor on the primary DPA, the workspace manager 316a on the primary DPA receives user input events from the user interface devices 324.

The coordination of the primary DPA's VVDD and the secondary DPA's VVDD allows drag-and-drop operations across regions of the shared workspace 202. In various implementations, when the workspace manager on the primary DPA determines that the cursor is in proximity to a region boarder (e.g., 204), is currently in a region boarder, or has moved across a region border in the shared workspace 202, the cursor on the primary DPA's display is hidden by the primary DPA's workspace manager and user input events (e.g., mouse position changes, mouse button presses) generated by the user interface devices on the primary DPA are forwarded by the primary DPA's VVDD to the secondary DPA's VVDD instead of being processed by the workspace manager on the primary DPA. In addition to user input events, clipboard contents including any graphical representations being manipulated by the cursor (e.g., icons, windows) are also forwarded to the secondary DPA's VVDD. In some implementations, the information sent between VVDDs is compressed or encoded.

On the secondary DPA, the workspace manager receives user input events from the VVDD on the secondary DPA instead of, or in addition to, receiving user input events from the user interface devices on the secondary DPA. The secondary DPA's VVDD receives the information described above and forwards user input events and graphical representations being manipulated to the workspace manager on the secondary DPA, in addition to updating the secondary DPA's clipboard contents based on the primary DPA's clipboard. The secondary DPA's workspace manager displays a cursor and updates the cursor's position and appearance based on the information received from the primary DPA's VVDD. When the secondary DPA's workspace manager detects that the cursor position is in proximity to a region boarder, is currently in a region boarder, or has moved across a region border in the shared workspace 202, the secondary DPA's workspace manager hides the cursor on the secondary DPA's display and forwards clipboard contents, last known cursor position, and any graphical representations associated with the cursor to the primary DPA's VVDD, after which the primary DPA's workspace manager resumes control of the cursor and the primary DPA's VVDD no longer forwards user input events and other information to the secondary DPA's VVDD.

Returning to the examples above, the folder icon 108a is associated with a donor GUI process. In some implementations, when the icon is dragged 122 information regarding the location of the file is placed on the clipboard by the donor process. Other ways of communicating information regarding what is being dragged are possible. When the icon 108a is dropped onto the drive icon 106, a recipient process examines the clipboard to determine the location of the file and then performs a copy or move operation to place the contents of the file in the top level directory of the file system associated with drive 106. When text from a word processing application window 120 is dragged 124, a copy of the text is placed on the clipboard along with source formatting information for the text by the word processing application. When the graphical representation of the text is dropped into the directory icon 108b, a recipient process copies the text from the clipboard into a new file created in the directory represented by icon 108b.

By way of illustration, when the icon 110 is dragged 116 through mouse input on a primary DPA whose display is associated with Region 1 of the shared workspace 202, information regarding components associated with the icon 110 is placed on the clipboard. When the cursor 116 transitions from Region 1 to Region 2 of the shared workspace 202, the clipboard's contents, icon 110 and subsequent mouse events are forwarded to the DPA associated with Region 2 (i.e., the secondary DPA). In this way, the recipient process on the secondary DPA can respond to the drop operation without having to know that the operation originated on another DPA. Because the clipboard's contents and user input events are shared between DPA's, drag-and-drop operations can also originate on a secondary DPA and terminate on a primary DPA. In the context of the drag-and-drop operation, the region in which the drag-and-drop operation begins is referred to as the donor region. Likewise, the region in which the drag-and-drop operation ends is referred to as the recipient region.

The downloader 314a-b is invoked by a recipient process to fetch components specified in the clipboard. A component does not necessarily correspond to a file. A component may be stored in a portion of a file that holds other components or data, in a single file dedicated to the component in question, or in multiple coordinated files. A component may be stored in a memory without first having been stored in a file. A component may include metadata that describes the component's type and other attributes. In some implementations, components are represented as markup language documents (e.g., eXtensible Markup Language). Other component representations are possible. In various implementations, the donor process places components on the clipboard, locations of components on the clipboard, or combinations of these. The downloader 314a-b can retrieve the components from the clipboard or from their designated locations. For example, the components can be retrieved from the donor process DPA or from a server 335. The downloader 314a-b invokes the component installer 313a-b to install components on the recipient process DPA. Installation can be merely copying the components to a drive accessible on the recipient process DPA or can be more involved. For example, an application component can require installation of information in various OS registries.

Figure 4:
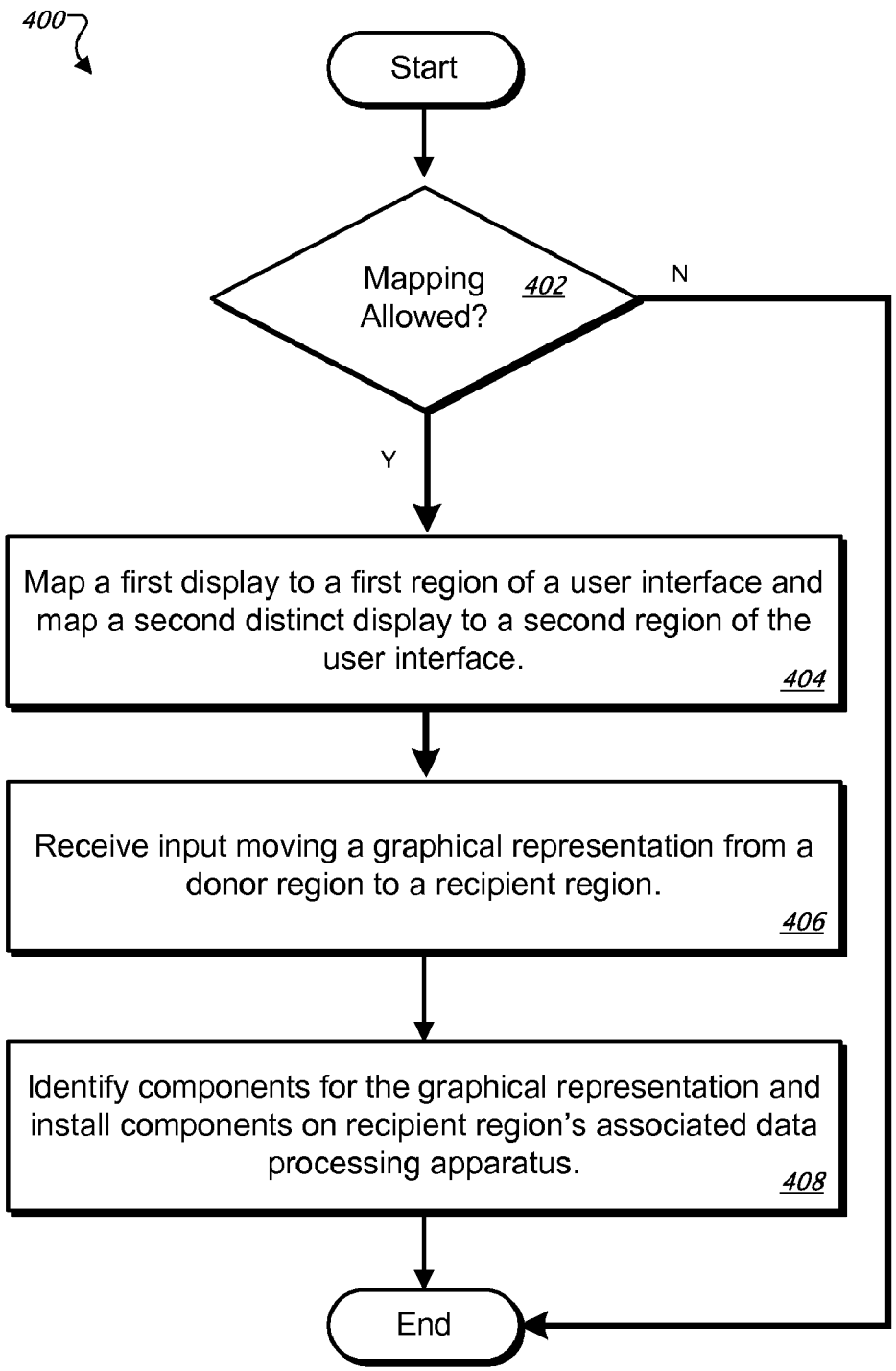
FIG. 4 is a flow chart of an example technique for moving components from one data processing apparatus to another through interaction with a shared graphical user interface.

FIG. 4 is a flow chart of an example technique for moving components from one data processing apparatus to another through interaction with a shared graphical user interface. A determination is made as to whether mapping between DPAs is allowed (step 402). If so, a first display associated with a first data processing apparatus is mapped to a first region of a shared workspace and a distinct second display associated with a distinct second data processing apparatus is mapped to a second region of the user interface (step 404). Input moving a graphical representation from a donor region is received comprising one of the first region and the second region to a recipient region comprising the other of the first region and the second region (step 406). In response to the moving, one or more components associated with the graphical representation are identified and installing the one or more components on the recipient region's associated data processing apparatus (step 408).

Various implementations of the systems and techniques described in this specification can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used in this specification, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the subject matter have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:
1. A computer-implemented method comprising:
mapping a first display associated with a first data processing apparatus to a first region of a shared workspace and mapping a distinct second display associated with a distinct second data processing apparatus to a second region of the shared workspace;
receiving input moving a graphical representation from a donor region comprising one of the first region and the second region to a recipient region comprising the other of the first region and the second region; and in response to the moving, identifying one or more components associated with the graphical representation and installing the one or more components on the recipient region's associated data processing apparatus.

2. The method of claim 1 where the first display presents the first region but not the second region, and where the second display presents the second region but not the first region.

3. The method of claim 2 where an operating system for the first data processing apparatus includes a virtual device representing the second display where the virtual device is mapped to a virtual device region of the first display.

4. The method of claim 3 where receiving input comprises displaying a pointer on the second display when the pointer is positioned over the virtual device region.

5. The method of claim 1 where the input is a drag-and-drop operation from the donor region to the recipient region.

6. The method of claim 1 where the mapping is in response to a communication between the first data processing apparatus and the second data processing apparatus.

7. The method of claim 6 where the communication is by way of a wireless connection between the first and second data processing apparatus.

8. The method of claim 1 where mapping comprises determining if the second data processing apparatus has allowed the mapping and preventing the mapping if the second data processing apparatus has not allowed the mapping.

9. The method of claim 1 where the installing is performed by the data processing apparatus associated with the donor region or a distinct other data processing apparatus.

10. The method of claim 1 where the one or more components is one or more of: a configuration information, capability information, content, a description of content, programming language statements or expressions, and executable software.

11. A computer program product, encoded on a non-transitory computer-readable medium, operable to cause data processing apparatus to perform operations comprising:
mapping a first display associated with a first data processing apparatus to a first region of a shared workspace and mapping a distinct second display associated with a distinct second data processing apparatus to a second region of the shared workspace;
receiving input moving a graphical representation from a donor region comprising one of the first region and the second region to a recipient region comprising the other of the first region and the second region; and
in response to the moving, identifying one or more components associated with the graphical representation and installing the one or more components on the recipient region's associated data processing apparatus.

12. The program product of claim 11 where the first display presents the first region but not the second region, and where the second display presents the second region but not the first region.

13. The program product of claim 12 where an operating system for the first data processing apparatus includes a virtual device representing the second display where the virtual device is mapped to a virtual device region of the first display.

14. The program product of claim 13 where receiving input comprises displaying a pointer on the second display when the pointer is positioned over the virtual device region.

15. The program product of claim 11 where the input is a drag-and-drop operation from the donor region to the recipient region.

16. The program product of claim 11 where the mapping is in response to a communication between the first data processing apparatus and the second data processing apparatus.

17. The program product of claim 16 where the communication is by way of a wireless connection between the first and second data processing apparatus.

18. The program product of claim 11 where mapping comprises determining if the second data processing apparatus has allowed the mapping and preventing the mapping if the second data processing apparatus has not allowed the mapping.

19. The program product of claim 11 where the installing is performed by the data processing apparatus associated with the donor region or a distinct other data processing apparatus.

20. The program product of claim 11 where the one or more components is one or more of: a configuration information, capability information, content, a description of content, programming language statements or expressions, and executable software.

21. A system comprising:
a display device;
a non-transitory computer readable medium including a program product; and
one or more processors configured to interact with the display device, execute the program product and perform operations comprising:
mapping a first display associated with a first data processing apparatus to a first region of a shared workspace and mapping a distinct second display associated with a distinct second data processing apparatus to a second region of the shared workspace;
receiving input moving a graphical representation from a donor region comprising one of the first region and the second region to a recipient region comprising the other of the first region and the second region; and
in response to the moving, identifying one or more components associated with the graphical representation and installing the one or more components on the recipient region's associated data processing apparatus.

22. The system of claim 21 where the first display presents the first region but not the second region, and where the second display presents the second region but not the first region.

23. The system of claim 22 where an operating system for the first data processing apparatus includes a virtual device representing the second display where the virtual device is mapped to a virtual device region of the first display.

24. The system of claim 23 where receiving input comprises displaying a pointer on the second display when the pointer is positioned over the virtual device region.

25. The system of claim 21 where the input is a drag-and-drop operation from the donor region to the recipient region.

26. The system of claim 21 where the mapping is in response to a communication between the first data processing apparatus and the second data processing apparatus.

27. The system of claim 26 where the communication is by way of a wireless connection between the first and second data processing apparatus.

28. The system of claim 21 where mapping comprises determining if the second data processing apparatus has allowed the mapping and preventing the mapping if the second data processing apparatus has not allowed the mapping.

29. The system of claim 21 where the installing is performed by the data processing apparatus associated with the donor region or a distinct other data processing apparatus.

30. The system of claim 21 where the one or more components is one or more of: a configuration information, capability information, content, a description of content, programming language statements or expressions, and executable software.

* * * * *